United States Patent
Niver et al.

(10) Patent No.: US 7,363,431 B1
(45) Date of Patent: Apr. 22, 2008

(54) MESSAGE-BASED DISTRIBUTED SYNCHRONIZATION IN A STORAGE SYSTEM

(75) Inventors: Brett D. Niver, Grafton, MA (US); Steven R. Chalmer, Auburndale, MA (US); Steven T. McClure, Northboro, MA (US)

(73) Assignee: EMC Corporation, Hopkinton, MA (US)

( * ) Notice: Subject to any disclaimer, the term of this patent is extended or adjusted under 35 U.S.C. 154(b) by 669 days.

(21) Appl. No.: 10/667,170

(22) Filed: Sep. 19, 2003

(51) Int. Cl.
*G06F 15/16* (2006.01)

(52) U.S. Cl. ............ 711/141; 707/201; 709/248; 713/375; 714/12; 714/55; 714/798; 718/106

(58) Field of Classification Search ........ 711/141; 707/201; 709/248; 718/106; 713/375; 714/12, 714/55, 798
See application file for complete search history.

(56) References Cited

U.S. PATENT DOCUMENTS

| | | | | |
|---|---|---|---|---|
| 4,330,826 A | * | 5/1982 | Whiteside et al. ............ 714/12 |
| 5,206,939 A | | 4/1993 | Yanai et al. |
| 5,434,995 A | * | 7/1995 | Oberlin et al. ............. 713/375 |
| 5,680,576 A | * | 10/1997 | Laudon .................... 711/145 |
| 5,778,394 A | | 7/1998 | Galtzur et al. |
| 5,845,147 A | | 12/1998 | Vishlitzky et al. |
| 5,892,923 A | * | 4/1999 | Yasuda et al. ............. 709/239 |
| 5,978,830 A | * | 11/1999 | Nakaya et al. ............. 718/102 |
| 6,571,324 B1 | * | 5/2003 | Elkington et al. .......... 711/162 |

\* cited by examiner

*Primary Examiner*—Matthew Kim
*Assistant Examiner*—Hetul Patel
(74) *Attorney, Agent, or Firm*—Muirhead and Saturnelli, LLC

(57) ABSTRACT

Described is a synchronization technique that may be used to coordinate processing between endpoints using the connecting message fabric. Processors in a data storage system communicate using the message switch of the message fabric. Each processor is an endpoint within a data storage system. A first endpoint may mark the beginning of the synchronization period by specifying a processing point at which other processors and the first endpoint are to coordinate from the perspective of the first endpoint. Synchronization is performed using local state information about the processing state of each endpoint as reported by each endpoint. The first endpoint waits for successful synchronization within a timeout period in accordance with the first endpoint's local state information. If successful synchronization does not occur prior to the timeout period, the first endpoint broadcasts a message with a new synchronization point to other endpoints. This indicates that the synchronization has failed marking the end of the synchronization period from perspective of the first endpoint.

45 Claims, 10 Drawing Sheets

MESSAGE-BASED DISTRIBUTED SYNCHRONIZATION IN A STORAGE SYSTEM

BACKGROUND

1. Technical Field

This application generally relates to a computer system, and more particularly to synchronization within the computer system.

2. Description of Related Art

Computer systems may include different resources used by one or more host processors. Resources and host processors in a computer system may be interconnected by one or more communication connections. These resources may include, for example, data storage devices such as the Symmetrix™ family of data storage systems manufactured by EMC Corporation. These data storage systems may be coupled to one or more host processors and provide storage services to each host processor. An example data storage system may include one or more data storage devices, such as those of the Symmetrix™ family, that are connected together and may be used to provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

Within a system, such as the Symmetrix™ data storage system, messages may be communicated between different components using a switch fabric. The switch fabric may include one or more switches arranged to permit transmissions of messages between different components or endpoints, such as processors or directors, included in a single Symmetrix system. Messages may also be referred to as frames and may include a header portion and a payload, such as data.

In a system, such as a data storage system with multiple endpoints, such as multiple directors, it may be necessary to synchronize operations at particular points in time between all or some of the multiple endpoints. It may be desirable to perform this synchronization in an efficient manner and that the synchronization be performed without using global shared state.

SUMMARY OF THE INVENTION

In accordance with one aspect of the invention is a method for synchronizing a plurality of endpoints in a data storage system at a first synchronization point. A first endpoint performs a synchronization start operation wherein a first message is sent from the first endpoint to one or more other endpoints in the data storage system. The first message includes a first key value corresponding to the first synchronization point representing a current processing state of the first endpoint. A timeout period is determined by the first endpoint. The first endpoint determines, using processing state information as reported to the first endpoint by other endpoints, whether synchronization with a selected portion of the one or more other endpoints at the first synchronization point has been accomplished within the timeout period. If the first endpoint determines that synchronization has not been accomplished within the timeout period, a second message is sent to the one or more other endpoints indicating that the first endpoint is at another synchronization point different from the first synchronization point.

In accordance with another aspect of the invention is a method executed in a data storage system for synchronizing execution at a first synchronization point between a plurality of processors in the data storage system. A synchronization start operation is performed by a first processor defining a beginning of a synchronization period for the first processor. The synchronization start operation includes the first processor performing: sending a first synchronization message to all other processors in the data storage system, the first synchronization message including a first key value corresponding to the first synchronization point representing a current processing state of said first processor; determining a portion of the plurality of processors with whom the first processor is to synchronize at the first synchronization point; determining whether synchronization at the first synchronization point has been accomplished for the portion of processors; and determining an expiration period indicating a maximum amount of time for which said first processor will wait for synchronization at said first synchronization point for the portion of processors. One or more other synchronization messages are received from other ones of the plurality of processors in the data storage system wherein each of the one or more other synchronization messages includes a key value indicating a processing state of its sending processor. The first processor stores, in a key value storage local to said first processor, key values from the one or more other synchronization messages, wherein the first processor uses key values in the key value storage to determine whether synchronization at the first synchronization point has been accomplished for the portion of processors as part of a synchronization check operation. The first processor performs a synchronization stop operation if synchronization at the first synchronization point is not accomplished for the portion of processors within the expiration time. The synchronization stop operation marks an end of the synchronization period for the first processor. Each processor communicates with other processors by sending messages using a message switch.

In accordance with another aspect of the inventions is a computer program product for synchronizing a plurality of endpoints in a data storage system at a first synchronization point. The computer program product includes: executable code that performs, by a first endpoint, a synchronization start operation wherein a first message is sent from the first endpoint to one or more other endpoints in the data storage system, the first message including a first key value corresponding to the first synchronization point representing a current processing state of the first endpoint; executable code that determines, by the first endpoint, a timeout period; executable code that determines, by the first endpoint using processing state information as reported to the first endpoint by other endpoints, whether synchronization with a selected portion of the one or more other endpoints at the first synchronization point has been accomplished within the timeout period; and executable code that, if the first endpoint determines that synchronization has not been accomplished within the timeout period, sends a second message to the one or more other endpoints indicating that the first endpoint is at another synchronization point different from the first synchronization point.

In accordance with another aspect of the invention is a computer program product for use in a data storage system for synchronizing execution at a first synchronization point between a plurality of processors in said data storage system. The computer program product includes: executable code that performs a synchronization start operation by a first processor defining a beginning of a synchronization period for the first processor, the first processor include executable code that performs the synchronization start operation including: executable code that sends a first synchronization message to all other processors in the data storage system, the first synchronization message include a first key value corresponding to the first synchronization point representing a current processing state of the first processor; executable code that determines a portion of the plurality of processors with whom the first processor is to synchronize at the first synchronization point; executable code that determines whether synchronization at the first synchronization point has been accomplished for the portion of processors; and executable code that determines an expiration period indicating a maximum amount of time for which the first processor will wait for synchronization at the first synchronization point for the portion of processors; executable code that receives one or more other synchronization messages from other ones of said plurality of processors in said data storage system wherein each of the one or more other synchronization messages includes a key value indicating a processing state of its sending processor; executable code that stores, by the first processor in a key value storage local to the first processor, key values from the one or more other synchronization messages, wherein the first processor uses key values in the key value storage to determine whether synchronization at the first synchronization point has been accomplished for the portion of processors as part of a synchronization check operation; and executable code that performs, by the first processor, a synchronization stop operation if synchronization at said first synchronization point is not accomplished for said portion of processors within said expiration time, said synchronization stop operation marking an end of the synchronization period for the first processor; and wherein each processor communicates with other processors by sending messages using a message switch.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF
EMBODIMENT(S)

Figure 1:
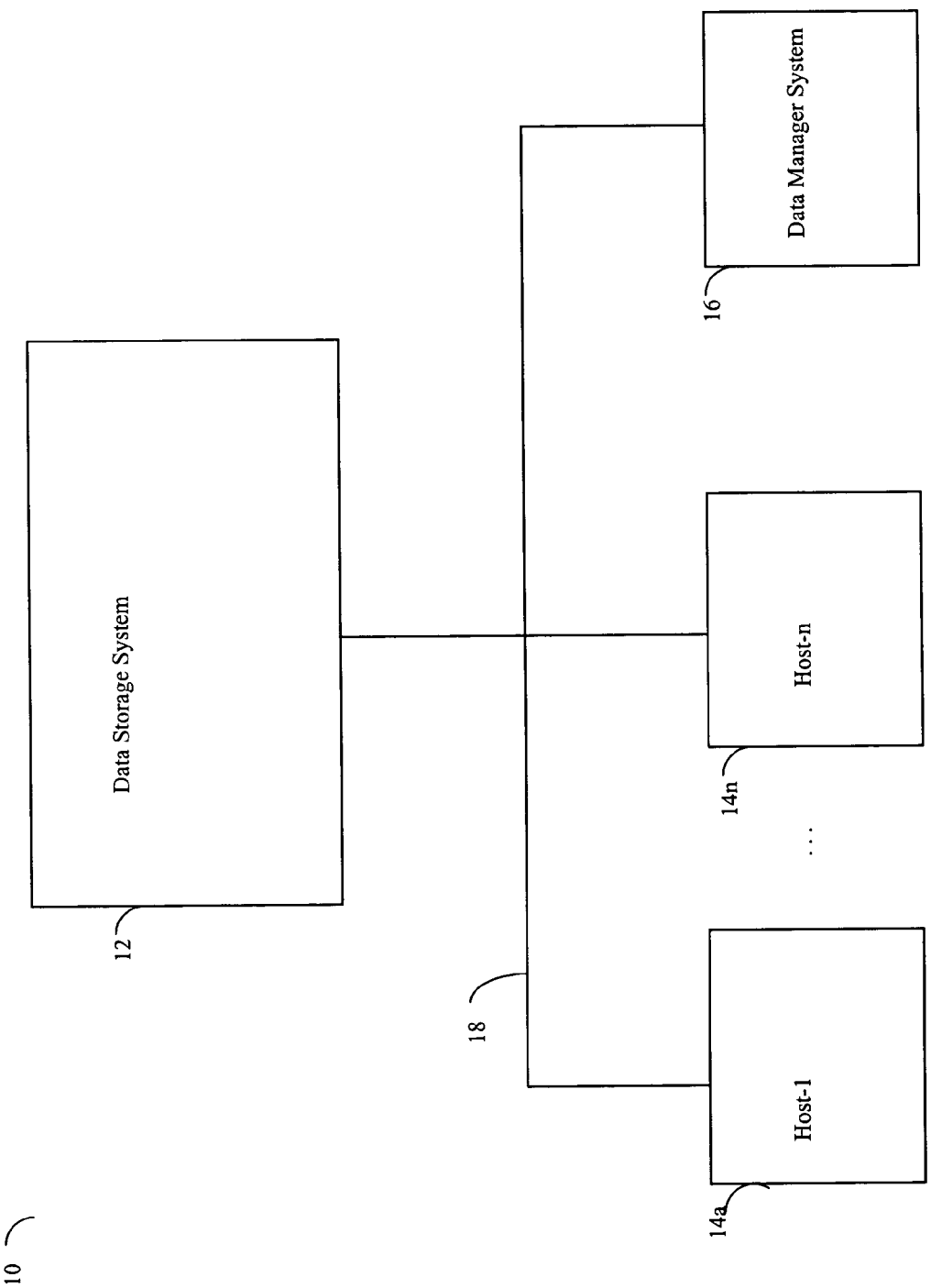
FIG. 1 is an example of an embodiment of a computer system according to the present invention.

Referring now to FIG. 1, shown is an example of an embodiment of a computer system according to the present invention. The computer system 10 includes a data storage system 12 connected to host systems 14a-14n, and a data manager system 16 through communication medium 18. In this embodiment of the computer system 10, the N hosts 14a-14n and the data manager system 16 may access the data storage system 12, for example, in performing input/output (I/O) operations or data requests. The communication medium 18 may be any one of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other connection(s) by which the host systems 14a-14n, and the data manager system may access and communicate with the data storage system 12, and may also communicate with others included in the computer system 10.

Each of the host systems 14a-14n, the data manager system 16, and the data storage system 12 included in the computer system 10 may be connected to the communication medium 18 by any one of a variety of connections as may be provided and supported in accordance with the type of communication medium 18. The processors included in the host computer systems 14a-14n and the data manager system 16 may be any one of a variety of commercially available single or multi-processor system, such as an Intel-based processor, IBM mainframe or other type of commercially available processor able to support incoming traffic in accordance with each particular embodiment and application.

It should be noted that the particulars of the hardware and software included in each of the host systems 14a-14n and the data manager system 16, as well as those components that may be included in the data storage system 12 are described herein in more detail, and may vary with each particular embodiment. Each of the host computers 14a-14n, as well as the data manager system 16, may all be located at the same physical site, or, alternatively, may also be located in different physical locations. Examples of the communication medium that may be used to provide the different types of connections between the host computer systems, the data manager system, and the data storage system of the computer system 10 may use a variety of different communication protocols such as SCSI, ESCON, Fibre Channel, or GIGE (Gigabit Ethernet), and the like. Some or all of the connections by which the hosts, data manager system 16 and data storage system 12 may be connected to the communication medium 18 may pass through other communication devices, such as a Connectrix or other switching equipment that may exist such as a phone line, a repeater, a multiplexer or even a satellite.

Each of the host computer systems as well as the data manager system may perform different types of data operations in accordance with different types of administrative tasks. In the embodiment of FIG. 1, any one of the host computers 14a-14n may issue a data request to the data storage system 12 to perform a data operation.

Figure 2:
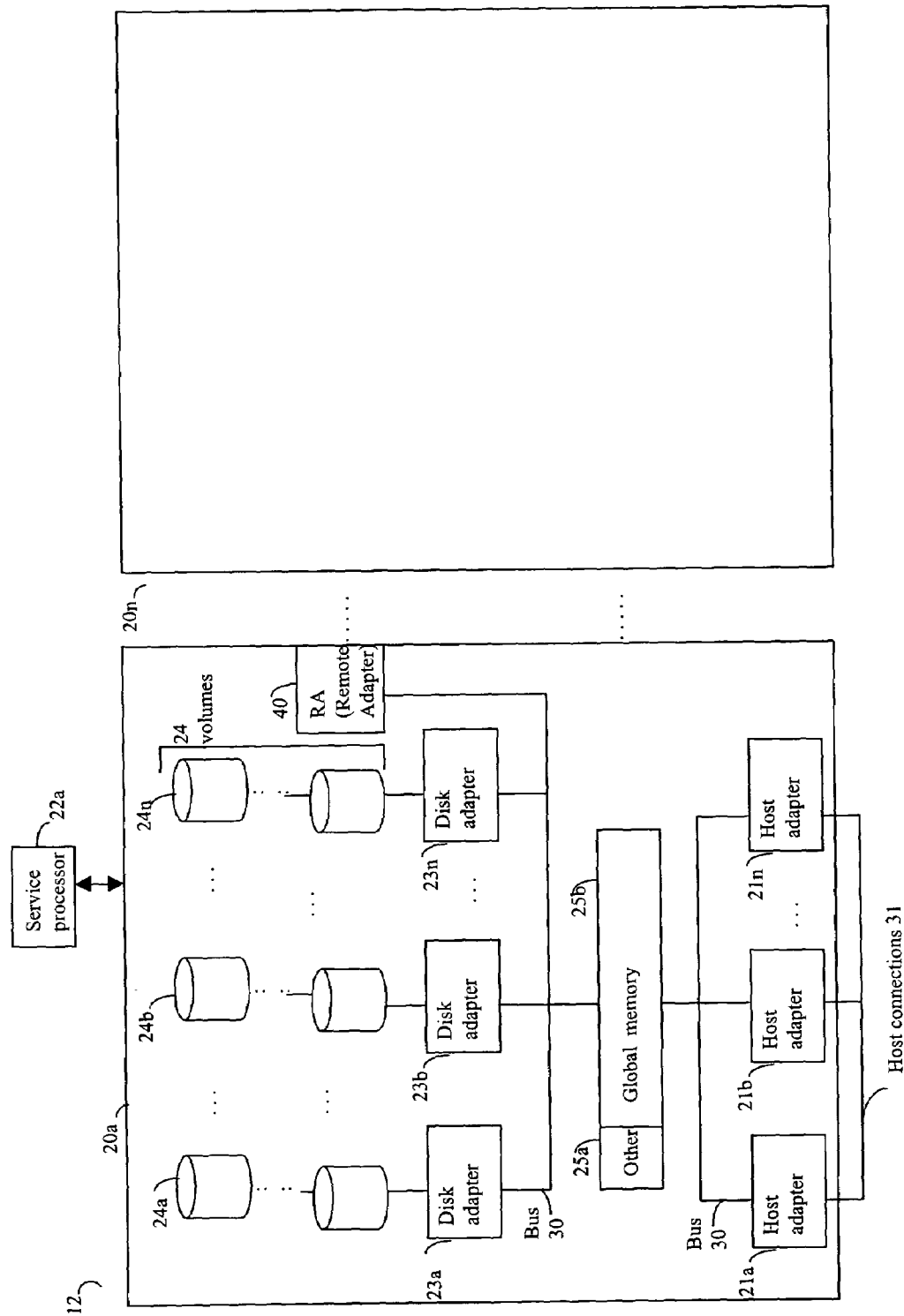
FIG. 2 is an example of an embodiment of a data storage system.

Referring now to FIG. 2, shown is an example of an embodiment of the data storage system 12 that may be included in the computer system 10 of FIG. 1. Included in the data storage system 12 of FIG. 2 are Symmetrix™ storage systems 20a-20n as manufactured by EMC Corporation of Hopkinton, Mass. In this particular example, each of the Symmetrix™ storage systems 20a-20n may be interconnected (not shown) as well as to the host and data manager systems through any one or more communication connections 30 that may vary with each particular embodiment and device in accordance with the different protocols used in a particular embodiment. Additionally, the type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include other types of data storage systems in combination with one or more Symmetrix™ systems. Each of 20a-20n may be resources included in an embodiment of the computer system 10 to provide storage services to, for example, host computer systems and/or the data manager system.

Each of the Symmetrix™ systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the Symmetrix™ system 20a, a single DA, such as 23a, may be responsible for the management of a row of disks or volumes, such as row 24a. Each of the DAs 23a-23n are connected, for example, by a bus 30 to a cache that includes a particular portion designated as global memory 25b. The DAs 23a-23n may perform data operations to and from the cache that may be included in the global memory 25b, for example, in communications with other disk processors or directors, and other components of the system 20a. Generally, the global memory 25b may be used in facilitating communications between components in the system 20a. The other portion 25a is that portion of memory that may be used in connection with other designations that may vary in accordance with each embodiment. In one embodiment, portions of configuration and device information may be stored in global memory 25b.

An embodiment of the Symmetrix™ system 20a may include a service processor 22a used to manage and monitor the system 20a. In one embodiment, the service processor 22a may be used in collecting performance data, for example, regarding the I/O performance in connection with system 20a. This performance data may relate to, for example, performance measurements in connection with a data request as may be made from the different host computer systems 14a-14n. This performance data may be gathered and stored, for example, in the global memory and/or other storage area.

The system 20a may also include one or more host adapters ("HAs") or directors 21a-21n. Each of these HAs may be used to manage communications and data operations between one or more host systems and the global memory.

The particular data storage system as described in this embodiment, such as a Symmetrix™ system by EMC Corporation or a disk, should not be construed as a limitation. Other types of commercially available data storage systems, as well as processors and hardware controlling access to these particular devices, may be also be included in an embodiment.

Also shown in the storage system 20a is an RA or remote adapter 40. The RA may be hardware including a processor used to facilitate communication between data storage systems, such as between two Symmetrix data storage systems. The RA may be used with the Remote Data Facility (RDF) product provided by EMC Corporation of Hopkinton, Mass.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. The HAs may be used in connection with communications between a Symmetrix data storage system and a host system. The RAs may be used in facilitating communications between two Symmetrix data storage systems. The DAs may be used in connection with facilitating communications to the associated disk drive(s) and LV(s) residing thereon.

The DA may cause I/O operations to be performed on a volume or device. In the following description, data may be accessed by LV in which a single DA manages data requests in connection with I/O operations of multiple LVs that may reside on a disk. The DA may accomplish this by creating job records for the different LVs associated with the particular DA. These different job records may be associated with the different LVs in a data structure stored and managed by each DA.

Figure 3:
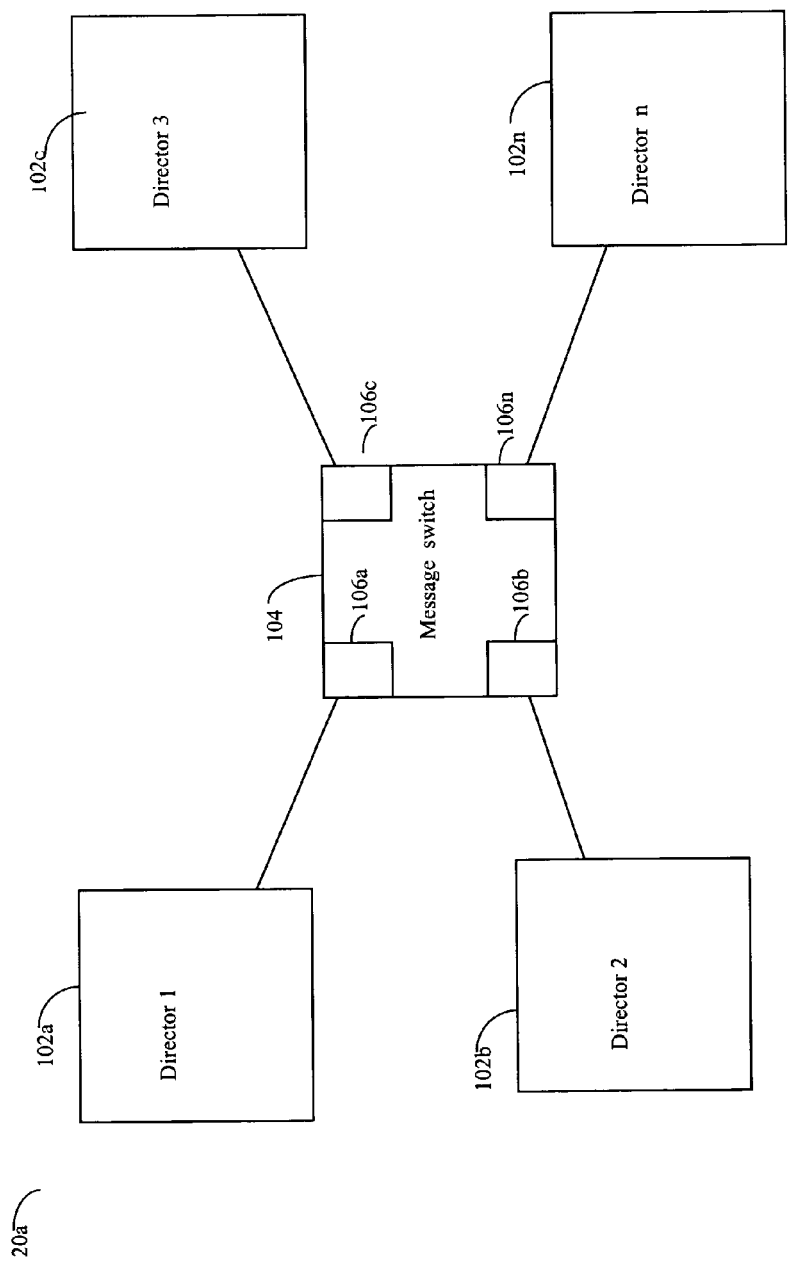
FIG. 3 is a more detailed example of one embodiment of a data storage system.

Referring now to FIG. 3, shown is a detailed example of an embodiment of components that may be included in the data storage system 20a. It should be noted that an embodiment may include other components than as shown in FIG.

3. The data storage system 20*a* of FIG. 3 presents a simplistic view including only particular components described previously in connection with FIG. 2 for purposes of illustration and example in connection with techniques that are described in the following paragraphs. It should also be noted that the components of FIG. 3 as described in connection with system 20*a* may also be included in each of systems 20*b*-20*n*.

This embodiment of the system 20*a* includes directors 102*a* through 102*n* and a message switch 104. The message switch 104 may be included within the switch fabric. The message switch may be used in routing messages between different directors or processors 102*a* through 102*n*. Included in the message switch 104 of this embodiment are a plurality of hardware message buffers 106*a*-106*n*. The message switch 104 controls the flow of incoming messages that may be stored in each of the buffers 106*a* through 106*n* from a respective director 102*a* through 102*n* connected to the message switch. Each of the directors 102*a* through 102*n* may be a processor or a printed circuit board that includes a processor and other hardware components. Each of the directors 102*a* through 102*n* may be referred to as nodes or endpoints within the system 20*a*. The message switch in this embodiment provides link-level flow control information by providing for flow of control of messages being transmitted, for example, between the message switch and a single director.

Figure 4:
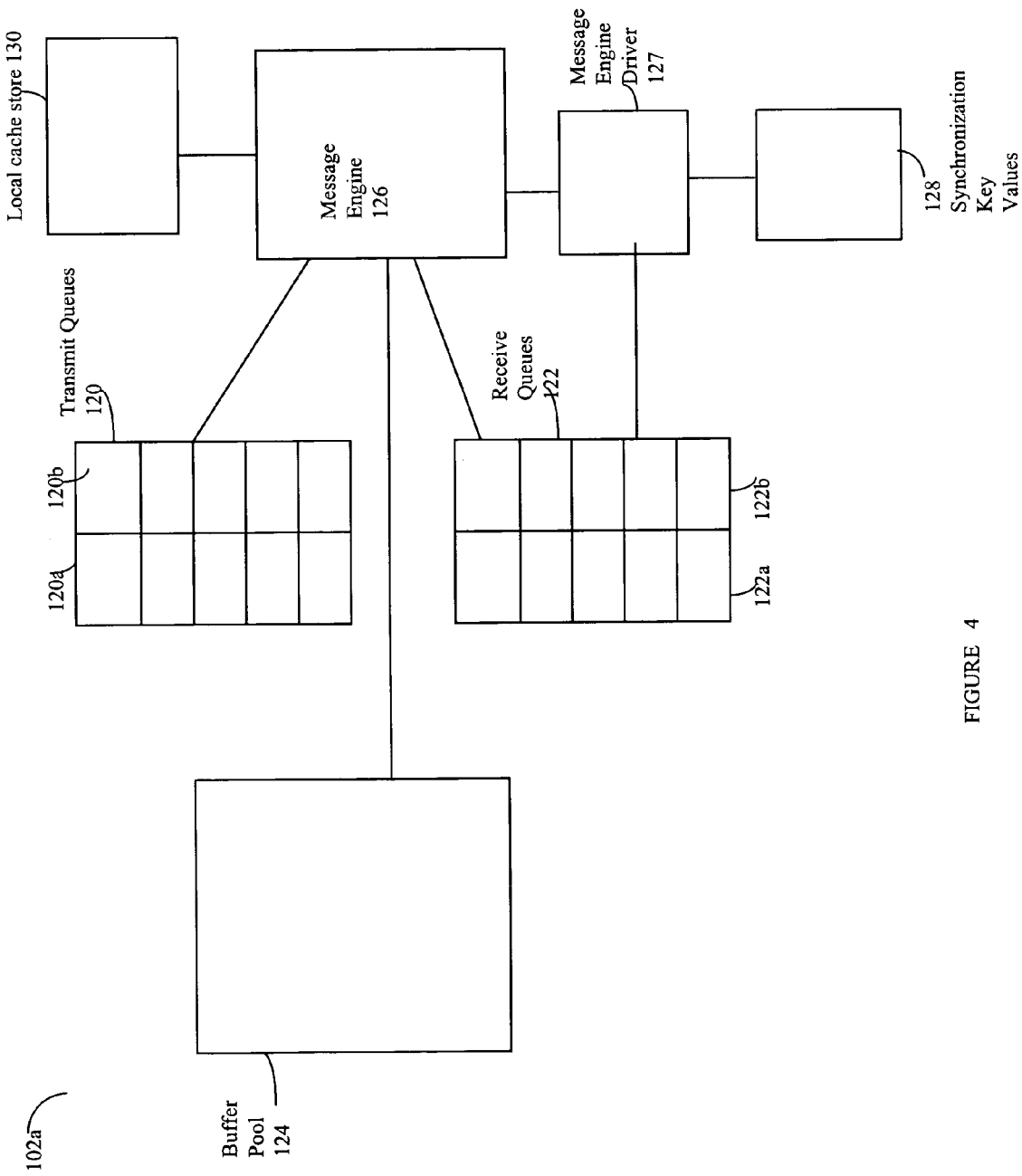
FIG. 4 is an example of an embodiment of components that may be included in a director.

Referring now to FIG. 4, shown is an example of an embodiment of hardware and/or software components that may be included within a director, such as director 102*a*. It should be noted that although details are shown for a single director 102*a*, each of the other directors 102*b* through 102*n* may similarly include components as described in connection with FIG. 4. An embodiment of a director may also include other components than as shown in FIG. 4. Included in FIG. 4 is a buffer pool 124, transmit queues 120, receive queues 122, a message engine 126, a local cache store (LCS) 130, a Message Engine Driver 127, and synchronization key values 128.

In this embodiment, there are two types of receive queues 122—a data receive queue 122*a* and a control receive queue 122*b*—used for buffering received transmissions. Additionally, in this embodiment are two types of transmit queues 120—a data transmit queue 120*a* and a control transmit queue 120*b*—used for buffering outgoing transmissions. A transmission or message may be a control transmission or a data transmission. Control transmissions or messages may be characterized as commands used in connection with controlling the flow of data messages between nodes. An embodiment may alternatively have a single transmit and/or receive queue that collectively holds both control and data messages rather than a separate queue for control messages and data messages.

An incoming transmission of the director or node 102*a* is placed in the appropriate one of the receive queues 122. The incoming transmission may then be retrieved from the receive queue 122 by the message engine 126 which extracts appropriate data portions for processing and places the data within a buffer obtained from the buffer pool 124. An outgoing message is placed in the appropriate one of the transmit queues 120. The message engine 126 extracts the data portion from the transmit queues 120 and forwards it to the message switch. It should be noted that the transmit queues 120 and the receive queues 122 may be used as temporary holding areas for transmissions respectively sent from, and to, a node or director 102*a*.

The local cache store (LCS) 130 may be implemented in hardware, such as a portion of SDRAM allocated for use by a single director or processor 102*a*. The LCS may include a locally cached copy of data. In one embodiment, the director 102*a* may use its LCS 130 to cache a local copy of a portion of data from global memory, such as global memory 25*b*. Also included in the LCS 130 may be other data items used by the director 102*a*. In connection with use of the LCS, an embodiment may use any one of a variety of different caching techniques that may vary in accordance with each embodiment.

The synchronization key values 128 identify processing states of other directors and may be used in connection with synchronization of the director 102*a* with one or more other directors at defined synchronization points. The synchronization key values 128, as may be used in connection with synchronization primitive operations, are described in more detail elsewhere herein.

In one embodiment, the synchronization key values 128 may be implemented and managed in software in contrast to the hardware queues, such as the transmit and receive queues. The synchronization key values may be implemented and managed by a processor executing instructions, such as may be produced using software, wherein the instructions are stored on a computer readable storage medium.

Transmissions, such as a synchronization messages, used in coordinating and synchronization of directors may be sent using the switch fabric data line or communication connection so that the incoming transmission sent to director 102*a* is placed into the data receive queue 122*a*. In this embodiment, the incoming transmission is then retrieved by the message engine 126 from the data receive queue 122*a*, and forwarded to software for placement and processing in the structure for storing the synchronization key values 128. In this embodiment, the message engine 126 retrieves the incoming transmission from the hardware queue, the data receive queue 122*a*, and then forwards it to the message engine driver 127 for placement into the synchronization key values 128. Similarly, outgoing messages which are synchronization messages may be sent to other directors from a broadcasting director's data transmit queue. In one embodiment, the message engine driver 127 is a device driver.

It should be noted that in this embodiment, the transmit queues 120 and the receive queues 122 are implemented in hardware, such as a portion of SDRAM (synchronous dynamic random access memory), and the buffer pool 124 is a portion of memory from which the data is allocated and used in connection with extracting the appropriate data portions of an incoming transmission for use within a particular node. Message engine 126 is implemented in hardware and manages the message queues. The synchronization key values 128 may be implemented as a data structure using a portion of memory, such as a RAM (random access memory). Other embodiments may implement these and other components in varying combination of hardware and/or software.

What will now be described are techniques that may be utilized in connection with synchronization of multiple directors using messages sent over the message switch. The techniques described herein may be used in other embodiments, for example, in which the nodes are other endpoints besides the directors as described herein.

The techniques described in the following paragraphs may be used in connection with coordination of multiple directors at a particular synchronization point. The directors may be included, for example, in a data storage system, such as the Symmetrix data storage system. The techniques described in following paragraphs may be used in an embodiment having one or more key values associated with different processing points or steps referred to as synchronization points. Each of the one or more key values is understood by all of the directors as corresponding to a particular processing point, for example, in connection with initialization processing or executing other processing steps. A key value for a synchronization point may be specified in one embodiment as a 16 bit value that represents a particular processing point.

In connection with performing synchronization described in following paragraphs, a first director, such as one of directors 102a-102n, may notify one or more other directors as to the first director's current point in processing by broadcasting a corresponding synchronization key value. This broadcasted key value may represent the processing state of the broadcasting director. Each director in this embodiment uses a local copy of the data structure 128 of the synchronization key values to keep track of the processing state of each particular director of interest. A director receiving key values from other directors corresponding to each of the other director's current processing state may record the key values in the synchronization key values structure 128. The receiving director may use this information in coordinating with other directors at a particular synchronization point.

What will now be described are different embodiments of the data structure 128 that may be included in an implementation.

Figure 5:
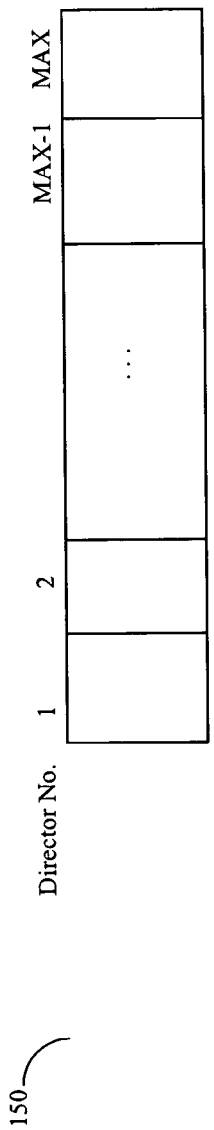
FIGS. 5A and 5B are example embodiments of data structures that may be used for storing synchronization key values maintained by each director.

Referring now to FIG. 5A, shown is an example of an embodiment of data structure 150 that may be used in implementing the synchronization key values 128 as included in each director of FIG. 4. The arrangement and representation shown in connection with FIG. 5A is one particular representation that may be used in an embodiment. Other embodiments may use other structures and techniques and as described herein and implementing and managing the synchronization key values.

Included in data structure 150 is a key value corresponding to the current synchronization for each director within the data storage system. The data structure 150 may be an array having a maximum number of elements corresponding to the maximum number of directors possible in an embodiment of the data storage system. In one embodiment, each element of the array 150 may be implemented as a 16 bit field for storing each key value. The director number may be used as an index into the array such that director identifier may be used in selecting the particular unique element of the data structure 150 representing the synchronization point or state information of the corresponding director. Other embodiments may use other techniques, for example, in uniquely mapping a director identifier to a particular element of the structure 150.

Referring now to FIG. 5B, shown is an example of another embodiment of data structure 160 that may be used in connection with implementing synchronization key values 128. The data structure 160 in this example is a table-like arrangement including one or more records with each record having two fields. Each record of the data structure 160 includes a first field corresponding to a director number and a second field including the key value for the director indicated in the first field of this record. The key value corresponds to the synchronization point representing the processing state of the corresponding director number.

It should be noted that the data structures 150 and 160 of FIGS. 5A and 5B respectively may be implemented as fixed size data structures in which storage is allocated in accordance with the maximum number of directors that may be included in the data storage system. An embodiment may use other techniques and other data structures known to those skilled in the art. The particular data structure may vary with each embodiment and those data structures described herein, such as in FIGS. 5A and 5B, should not be construed as a limitation.

As part of processing in connection with performing certain tasks, such as when a data storage system is coming on line or performing initialization processing, messages may be exchanged between the directors included in the data storage system. This is one example where a synchronization technique may be used. Another example where the techniques described herein may be used is in connection with bringing a memory board or other piece of hardware on line. Consider, for example, a memory board that has an error and is brought off line unavailable for use. Any accesses by a director to the memory board result in an error condition. At some point in time later, the memory board is fixed and brought back on line. As the memory board is being brought on line for use in the data storage system, the memory board is recognized by all of the directors by having each director perform recognition processing steps. Bringing the memory board on line for use by each of the directors may be synchronized by synchronizing at particular recognition processing steps. These are just two examples in which the techniques described herein may be used.

It is important to note that the techniques described herein facilitate synchronization. Enforcement of the synchronization at various points may be performed, for example, by other instructions included in each of the directors.

During initialization processing or when performing other processing steps, the directors may communicate with each other by broadcasting messages using the message switch. For example, each director may send synchronization messages to other directors continuously broadcasting where the broadcasting director is in performing initialization processing. Additionally, when each director receives the synchronization messages, each director may record locally within its own synchronization key value data structure 128 various key values representing the current synchronization points of each of the other directors included in the data storage system.

Figure 6:
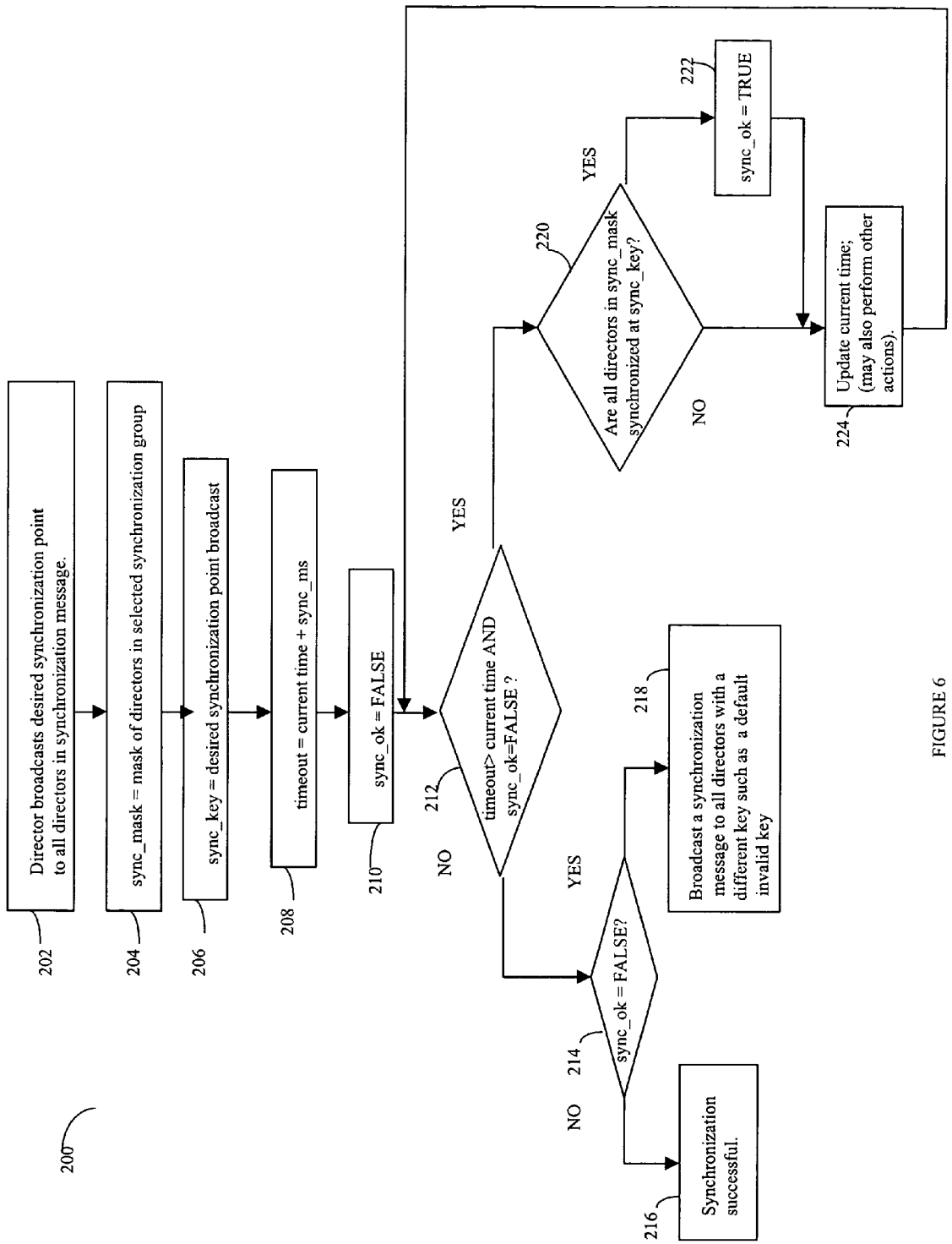
FIG. 6 is a flowchart of processing steps of one embodiment by a director for synchronizing with one or more other directors at a particular synchronization point.

Referring now to FIG. 6, shown is a flowchart 200 of steps that may be performed in one embodiment for coordination between multiple directors. A first director may have reached a particular synchronization point and desires to coordinate with other directors at this same synchronization point by performing a synchronization start operation. The first director may be any one of the multiple directors included in the data storage system. At step 202, the first director broadcasts the desired synchronization point to all directors within the data storage system. This may result in a synchronization message being sent to all directors with the desired synchronization point representing the current synchronization processing state of the first director. Additional processing steps may be performed within the first director as part of the synchronization start operation. Although the synchronization message is sent to all directors, the first director may only be interested in a coordinating with a portion of the directors. Accordingly, the first director may also use a synchronization group indicator, such as a synchronization mask, identifying the particular directors with which the first director wishes to coordinate.

The first director may store at step 204 a mask of the directors included in the selected synchronization group in a variable called sync_mask. At step 206, the first director stores in the variable sync_key the desired synchronization point that was broadcast at step 202. At step 208, the first director determines a timeout period for synchronization. The timeout period is calculated by the first director as the current time plus some delta time value which, in this example, is referred to as sync_ms. In one embodiment, sync_ms specifies a number of milliseconds used in defining a timeout period. The first director will wait a predetermined amount of time for the other directors to reach the desired synchronization point. In this example, this timeout period occurs when the current time equals timeout as determined at step 208.

An embodiment should select the sync_ms or delta value of the timeout period with care. It should be noted that the delta value or the value of sync_ms included in each embodiment may vary in accordance with the particulars of each system. The timeout value selected at step 208 may vary in accordance with the particular processing steps being performed as well as the number of directors, message traffic, and other system parameters and values. It should be noted that when selecting a value for sync_ms in an embodiment, the first director may remain in a wait state for up to the specified timeout period, or it may perform other actions unrelated to the synchronization process during the specified timeout period.

Processing proceeds to step 210 where a variable used in connection with the method steps of flowchart 200, sync_ok, is set to false. As used in subsequent processing steps of flowchart 200, sync_ok is a boolean flag which is set to TRUE when the specified synchronization point has been coordinated for those directors of interest. In step 212, a determination is made as to whether the variable timeout is greater than current time, and whether the variable sync_ok is false. If so, control proceeds to step 220 where a determination is made as to whether all directors as specified in the sync_mask variable are synchronized at sync_key. The determination at step 220 may be made by examining the values stored within the local synchronization key value 128 of the first director. If a determination is made that all directors have reached the synchronization point, control proceeds to step 222 where the variable sync_ok is set to true and control proceeds to step 224. Otherwise, at step 220 if it is determined that all directors have not reached the specified point, sync_key, control proceeds to step 224 directly where the current time is updated to the next time increment, and other system actions may be performed. Control proceeds to step 212 where the processing of the loop formed by steps 212, 220, 222 and 224 are executed until a NO determination is made at step 212. When, at step 212 the condition: ((timeout>current time) AND (sync_ok=FALSE)) evaluates to NO or FALSE, control proceeds to step 214.

At step 214 a determination is made as to whether sync_ok is FALSE. It should be noted that the variable sync_ok a boolean flag which is initially false, as set at step 210, and then set to true if, during processing, it is determined that all of the directors specified in sync_mask have synchronized at the point specified in sync_key. If, at step 214, sync_ok equals FALSE, then a timeout period has been reached prior to the selected synchronization group of directors synchronizing at the desired synchronization point, sync_key. Accordingly, control proceeds to step 218 where the first director then broadcasts a synchronization message to all directors with a new key value corresponding to a new synchronization point. In one embodiment, the new synchronization point broadcast at step 218 may be a default invalid key indicating that the first director has advanced to a different synchronization point. The new key value may be, for example, an invalid key value indicating an invalid processing state. The new key value may also be a valid key value corresponding to a new, valid processing state of the broadcasting director. The sending of the synchronization message with the new key value may represent a state of the broadcasting director marking the end of the synchronization period for the first director. From the perspective of the first director, the synchronization or coordination of the directors indicated by sync_mask at synchronization point sync_key has failed. If, at step 214, it is determined that sync_ok does not equal FALSE, control proceeds to step 216 where, from the perspective of the first director, the synchronization point has been reached successfully for those directors specified in the selected synchronization group. The first director may then perform any processing associated with this successful synchronization which may vary with each embodiment and particular use of the techniques described herein. In the foregoing description, particular steps are noted as being from the perspective of the first or broadcasting director which may be characterized as representing locally to the first director. Other directors are unaware of timeout period, the failure of synchronization, and the like as determined by the broadcasting director.

As an example of the foregoing, an embodiment may have each director perform initialization processing steps. The initialization processing steps may have four predetermined synchronization points. When each director reaches the first of the predetermined synchronization points, it waits until the earliest in time of the following occur before proceeding further: 1) the other directors have also reached the first predetermined synchronization point, or 2) a predetermined amount of time expires. This process is performed for each of the four predetermined synchronization points. When the last of the directors reaches the last predetermined synchronization point, the directors may cease broadcasting any further synchronization message in order to communicate where each director is in their respective initialization processing. The determination that the last director has reached the last predetermined synchronization point may be made by each director examining its own local copy of the synchronization key values.

Figure 7:
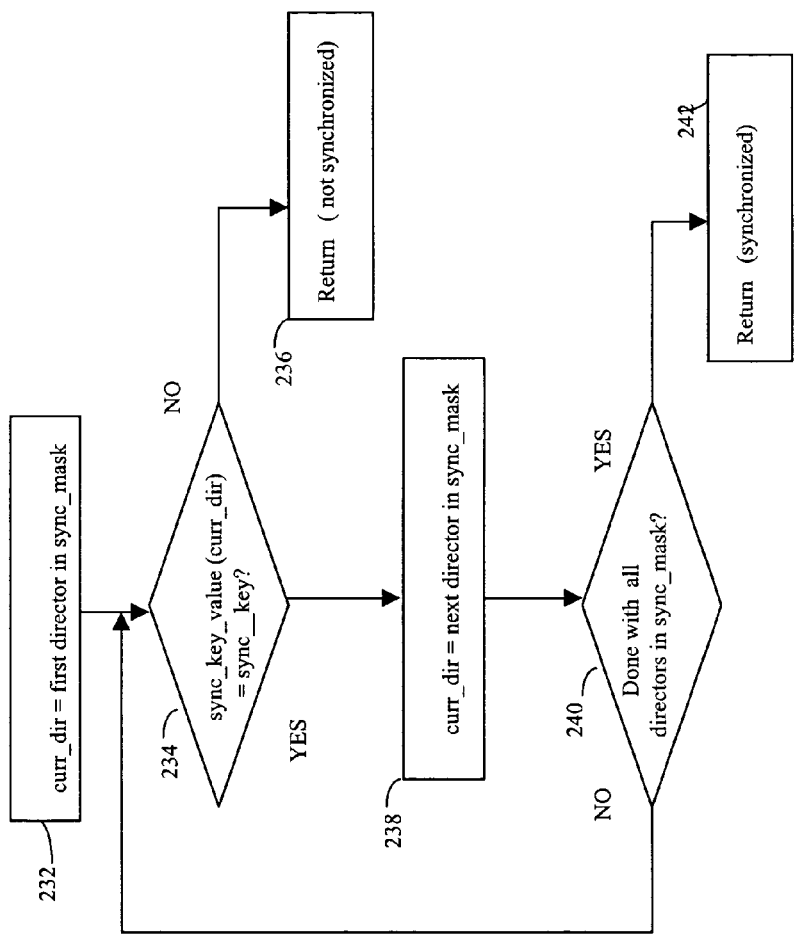
FIG. 7 is a flowchart of more detailed processing steps that may be performed by a director in connection with determining whether one or more directors have reached the particular synchronization point.

Referring now to FIG. 7, shown is a flowchart of more detailed processing steps that may be performed in an embodiment in connection with determining whether all of the directors in a selected synchronization group have synchronized at the point specified in sync_key. The flowchart of FIG. 7 represents more detailed processing steps that may be included in an embodiment in connection with step 220 of flowchart 200 described previously in connection with FIG. 6.

The processing steps of FIG. 7 may use the data structure synchronization key values 128 stored locally within the director performing the processing, such as the first director described previously in connection with flowchart 200 of FIG. 6. The processing steps of FIG. 7 may be embodied with a routine invoked at step 220 of FIG. 6. The routine may return a boolean value indicating whether the directors have synchronized or not based on the values stored in the director's local synchronization key values 128. At step 232, a variable, curr_dir, is used which represents the current director whose current synchronization key value is being examined. At step 232, curr_dir is assigned a first director as indicated in the sync_mask variable. At step 242, a determination is made as to whether a synchronization key value of the current director is equal to the variable sync_key. If so, control proceeds to step 238 where the variable curr_dir is assigned the next director in the sync_mask variable. At step 240, a determination is made as to whether all of the directors identified in accordance with sync_mask have had their synchronization key values tested. If so, control proceeds to step 242 where a value of synchronized is returned. Otherwise, control proceeds back to step 234 where the next director has its associated synchronization key value examined at step 234. If, at step 234, a determination is made that the synchronization key value corresponding to the current director as indicated by the variable curr_dir is not equal to the synchronization key value of sync_key, control proceeds to step 236 where a value of "not synchronized" is returned. It should be noted that the processing steps of flowchart 220 stop at the first occurrence of a synchronization key value of a current director being determined as not equal to the specified synchronization key, sync_key. Once there has been a determination that any one of the directors is not synchronized, additional comparisons at step 234 are not necessary for the current invocation of flowchart 220 processing.

It should be noted that other embodiments may use other techniques and perform other processing steps in connection with determining whether all the directors as specified in a sync_mask have reached the specified synchronization point as indicated by sync_key.

Figure 8:
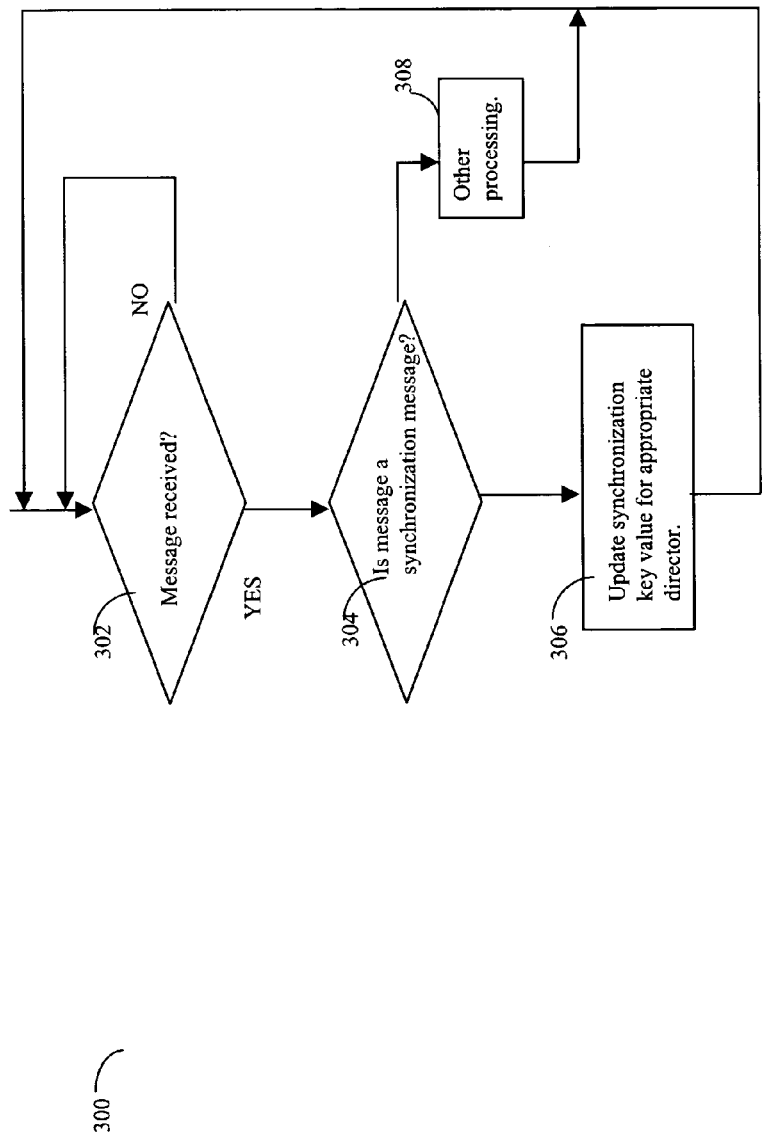
FIG. 8 is a flowchart of processing steps that may be performed by a director in processing received messages.

Referring now to FIG. 8, shown is a flowchart of processing steps that may be performed in an embodiment by each director in connection with processing messages received. In particular, the director may perform the processing steps of flowchart 300 in connection with maintaining and updating the synchronization key values 128. At step 302, a determination is made as to whether a message has been received by the director. If not, control proceeds back to step 302 where the director waits until a message has been received. Once a message has been received, control proceeds to step 304 where a determination is made as to whether the message is a synchronization message used in connection with updating values in the synchronization key values 128. If it is determined that the message is not a synchronization message at step 304, control proceeds to step 308 where other processing may be performed in accordance with the particular type of message that has been received. If at step 304 it is determined that the message is a synchronization message, control proceeds to step 306 where the appropriate entry in the synchronization key values 128 is updated in accordance with the received synchronization message. In one embodiment, a synchronization message may include a key value and indicate the director which sent the message. The director which sent the message is broadcasting, for example, that it has reached a particular point in processing as indicated by the received key value. The synchronization message may be sent, for example, in connection with steps 202 and 218 processing by a director.

As described herein, any one of the directors may desire to perform synchronization at a predetermined point with one or more other directors. The director may define a synchronization period from the director's perspective by broadcasting the desired synchronization point which is the current synchronization point of the broadcasting director. The director may perform the processing steps of FIGS. 6 and 7. Each director in the data storage system may also perform the processing steps in this embodiment as indicated in flowchart 300 of FIG. 8 in processing messages received on the received queues 122. The messages exchanged in performing the synchronization and/or coordination processing described herein may use the data receive queue and data transmit queues of the directors. In one embodiment, each of the directors in the data storage system may perform the steps of FIGS. 6, 7, and 8 in order to facilitate synchronization and coordination among two or more of the directors.

Figure 9:
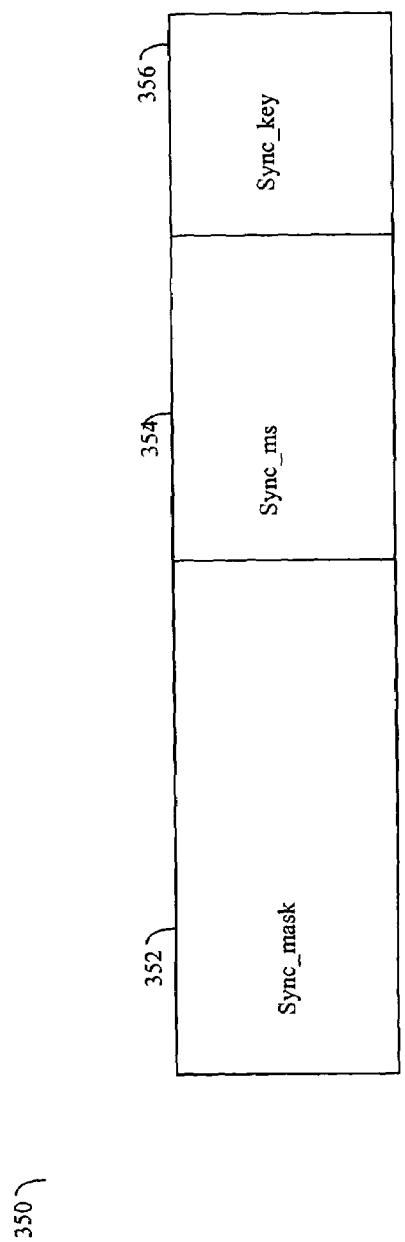
FIG. 9 is an example of an embodiment of a synchronization data structure that may be used by a director in storing data used in performing synchronization processing steps.

Referring now to FIG. 9, shown is an example of a data structure 350 that may be used by a director to store data for the synchronization processing described herein. The structure 350 includes those variables described, for example, in the processing steps of the flowcharts of FIG. 6, FIG. 7, and FIG. 8. The synchronization data structure 350 includes a first field sync_mask 352, a second field sync_ms 354, and a third field sync_key 356. In one embodiment, the sync_mask field 352 specifies the destination mask defining the group for synchronization as described, for example, in processing steps 202 and 204 of flowchart 200. In one embodiment, the sync_mask field may be implemented as a 64 bit field with one bit position corresponding to each of the possible directors that may be included in the data storage system. The synchronization data structure 350 may be stored in a portion of memory, such as random access memory (RAM) utilized to perform the techniques described herein. The field sync_ms 354 specifies the number of milliseconds in this embodiment from initialization time defining the timeout period for synchronization. In other words, sync_ms 354 is a 32 bit field in one embodiment that is a number of milliseconds representing the delta time which is added to the current time to determine the timeout period as specified, for example, at step 208 of flowchart 200. The sync_key field 356 in one embodiment may be implemented as a 16 bit field including a specific key value corresponding to a particular synchronization point. The field sync_key is used, for example, at step 206 of flowchart 200.

Figure 10:
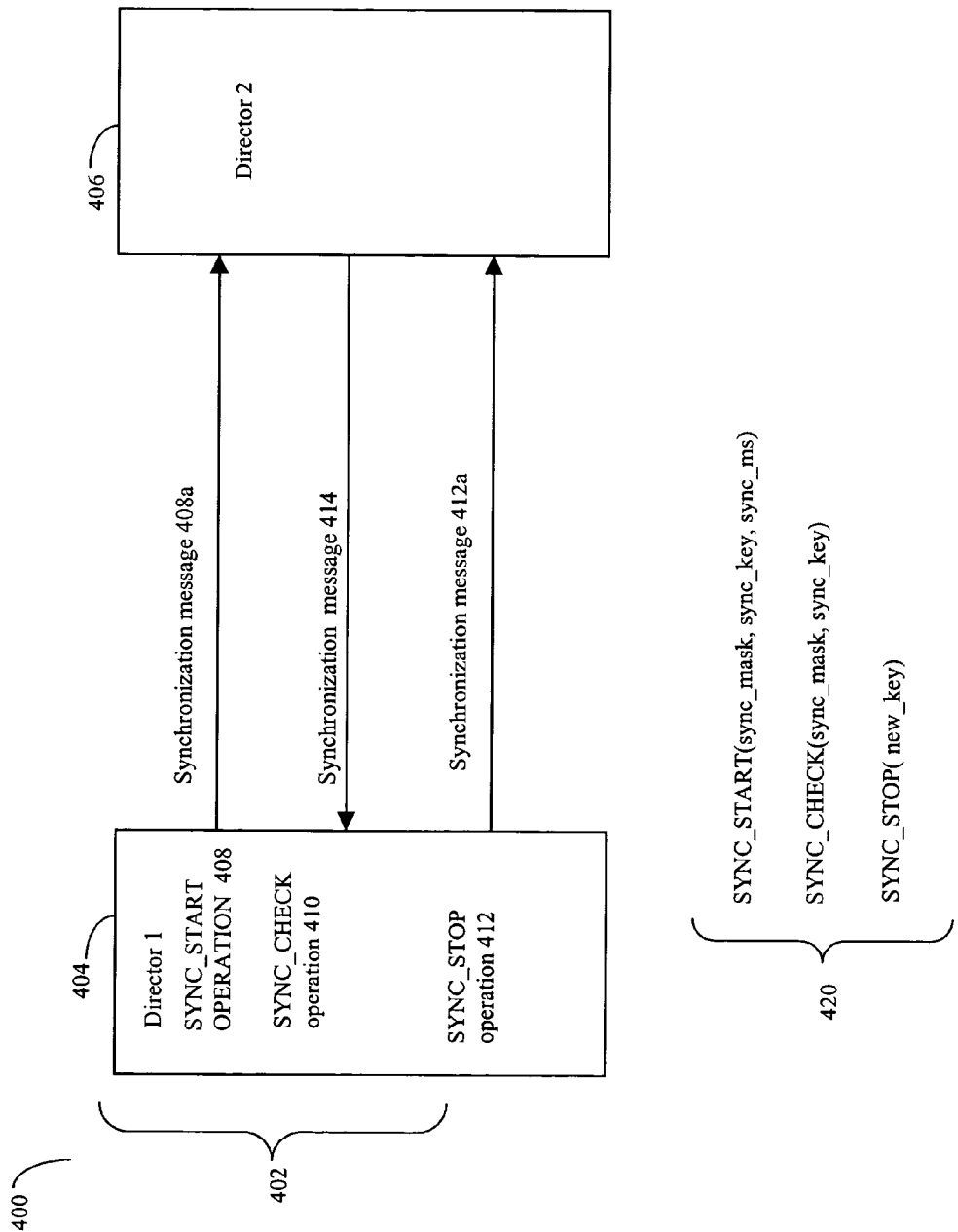
FIG. 10 is an example of operations, messages exchanged, and associated application programming interfaces defined and used in implementing the synchronization techniques as a synchronization primitive.

Referring now to FIG. 10, shown is an example 400 of the synchronization messages and application programming interface (API) that may be used in connection with implementing a synchronization primitive for coordination between multiple directors as described herein. The messaging protocol is illustrated as 402 between director 1 and director 2 within the data storage system. In this example, director 1 defines a synchronization period from the perspective of the director 1. It should be noted that director 1 may be synchronizing with more than one director. However, for the sake of illustration of the messages exchanged between a first broadcasting director and other directors within the same data storage system, only a single director in addition to the broadcasting director, director 1, is shown in 402. However, the same messages are exchanged with other directors. The foregoing synchronization techniques may be implemented as a synchronization primitive with three defined operations. The first operation associated with a synchronization primitive may be the sync_start (synchronization start) operation defining the beginning of a synchronization period. In this example, director 1 404 may be characterized as the synchronizing director that defines the beginning of a synchronization period from the perspective of director 1 404 by performing the sync_start operation 408. The sync_start operation results in synchronization message 408*a* being sent to all directors within the data storage system including director 2 406. Locally within director 1 404, a sync_ms value is determined and used in connection with defining the timeout period. As described elsewhere herein, the timeout period marks the maximum amount of time that director 1 404 will wait for the other directors to synchronize before director1 404 continues with other processing steps. The director 1 may also store a mask, sync_mask, identifying a selected group of directors with which director 1 wishes to coordinate processing. The synchronizing director 1 404 then checks the values in its local synchronization key value 128 to determine if synchronization has been accomplished by performing the sync_check (synchronization check) operation. It should be noted that the sync_check operation in this embodiment may be performed as part of sync_start processing and also at subsequent predetermined time intervals. The synchronizing director, which in this instance is director 1 404, waits until the first occurrence of either 1) expiration of the timeout period or until the synchronization event from the perspective of director 1 has occurred with success. If synchronization does not occur prior to the timeout period, the synchronizing director 1 404 may perform a sync_stop (synchronization stop) operation 412 resulting in a synchronization message 412*a* sent from director 1 404 to all directors including director 2 406. The sync_stop operation 412 marks the end of the synchronization period for director 1 404. Director 1 404 broadcasts a synchronization message 412*a* which includes another key value indicating, for example, another synchronization point. The key value included in message 412*a* may also be a default invalid key value specifying an invalid synchronization point to all other directors.

After director 1 performs the sync_start operation resulting in a synchronization message 408*a* sent to director 2 406, director 2 may send one or more synchronization messages 414 to director 1 broadcasting director 2's current synchronization point. Each of the messages 408*a*, 414, and 412*a* results in a synchronization message being sent from one director to another including a key value indicating the current synchronization point as a processing state of the sending director.

Referring to element 420 of FIG. 10, the three operations, sync_start, sync_check, and sync_stop may be implemented using an application programming interface (API) similar to those as described in 420. The operations defined at 420 may be performed by the synchronizing director. The sync_start and the sync_stop operations result in a broadcast synchronization message being sent to other directors within the data storage system. The sync_check operation may be performed locally within the director 404 in order to check and monitor the values representing the processing state of each of the other directors of interest. It should be noted that in the event that the sync_check operation determines that the synchronization point has been successfully reached by all the directors indicated in sync_mask, sync_stop operation is not performed by director 1 404.

Using the techniques described herein, as soon as all of the directors as indicated by the sync_mask value have reported to be at the same synchronization point as the synchronizing director, the synchronization processing is considered to have been accomplished from the perspective of the synchronizing director. However, if the time period or expiration period has been reached prior to this being accomplished, the synchronization is considered to have failed from the perspective of the synchronizing director. It should be noted that the particular messages and their form exchanged between the directors as illustrated in 400 of FIG. 10 are only example messages that may be exchanged in connection with performing the synchronization.

The techniques described herein do not actually enforce synchronization but rather may be characterized as facilitating synchronization and allowing synchronization to occur. The synchronization techniques described herein may be used in connection with other synchronization enforcement techniques that may vary in accordance with each embodiment and use.

As previously mentioned, the synchronization techniques described herein may be used, for example, in connection with bringing a memory board or other component of a data storage system online. Each director may execute the processing steps described herein. Each director may also perform recognition processing steps until it is able to recognize the component being brought online. Once each director has reached a particular synchronization point in performing recognition processing, it may be desirable to have the director wait until all other directors reach the same synchronization point, or wait a predetermined amount of time before continuing. Each director may execute steps independently of the other directors in connection with recognition processing. Recognition processing may continue for a specified time period such that each director independently recognizes the particular component. In connection with performing this, a first director may reach the synchronization point corresponding to the end of the recognition processing and broadcast this to all other directors in the data storage system. The first director may wait a predetermined amount of time for other directors to reach the same synchronization point. The amount of time may be determined in accordance with the execution time for performing the recognition processing steps and/or other parameters of the particular system. Until the component coming online is itself ready to be recognized for use by directors within the system, a director attempting to recognize the component coming online may receive an error message resulting in the director retrying the recognition processing steps, or a portion thereof. After a predetermined amount of time has expired, a synchronization failure is determined from the perspective of that first director. Whether other synchronization enforcement processing is performed, for example, in connection with this failure or other failures from the perspectives of each director may vary in accordance with each embodiment.

Using the techniques described herein, synchronization and coordination may be performed between multiple directors in a data storage system using the message switch. It should be noted that no global shared state is used. Rather, messages are exchanged using a distributed technique facilitated by the use of the message switch. It should also be noted that at a particular point in time, all of the directors may not have the same local snapshot of synchronization key values. In other words, the primitives described herein do not require synchronization of the synchronization key values as maintained and used by each director. At any particular point in time, using the techniques described herein, the first director may have a first set of synchronization key values which differs from the second set of synchronization key values stored locally within another director.

It should be noted that the particular sizes, data structures, and the like described herein may be used in connection with an embodiment. Other embodiments may utilize other techniques and data structures other than as described herein as known to those of ordinary skill in the art to implement the synchronization and coordination techniques described herein.

Although the synchronization primitive and its operations as defined herein do not enforce synchronization among the directors, other enforcement code may be included within a director for use with the synchronization techniques described herein. The synchronization techniques described herein may be characterized as performing synchronization with a distributed approach without using any form of globally accessed state information. Each director may perform synchronization in accordance with it own local copy of state information, such as the private copy of the synchronization key values 128 maintained and used by each director. As described herein, the synchronization techniques may be used in an embodiment implementing a peer-to-peer synchronization model. As each of the directors reach the synchronization point, they may wait for other directors to also reach the same synchronization point before proceeding, for example, in connection with performing initialization processing. There is no designated master or controlling director in this type of model. The same synchronization primitives described herein may also be used embodiments implementing other synchronization models as well.

The foregoing synchronization techniques are flexible in that they may be used as synchronization primitive in many different applications. The synchronization techniques described herein may be used in applications to take different actions in accordance with what may be characterized as varying degrees of synchronization. For example, consider multiple directors each executing steps to perform the synchronization techniques described herein using executable instructions stored on a computer readable storage medium. Referring back to FIG. 6, step 214, when a first director's timeout period expires and synchronization has not been accomplished among all directors in the selected group of directors, control proceeds to step 218. The first director may then determine whether synchronization has occurred for one or more predetermined numbers or percentages of other directors, and take one or more alternate actions in accordance with this determination. The first director may, for example, decide that a lesser degree of synchronization "success" has occurred if at least a minimum number of other directors have reached a particular synchronization point from the perspective of the first director as determined using the first director's private copy of the key values 128. This may be an alternative to the first director selecting from only two possible outcomes of success or failure. The first director may determine take an action in accordance with a determining one of several predetermined numbers of synchronized directors.

The foregoing synchronization techniques may be used in connection with performing monitoring activities. For example, each of the directors may post messages to a monitor director with key values indicating current processing points of the broadcasting directors. A monitor director records each of the key values in the structure 128 as reported and notes when a director has reached a particular synchronization point. At particular points, the monitor director may turn on/off monitoring functions as applied to other directors in accordance with stored key values for those other directors. The one or more synchronization points may be used as by the monitor director as trigger conditions or points.

In one embodiment of a data storage system, such as the Symmetrix data storage system, the foregoing techniques may be used in connection with a dual write memory. The dual write memory feature may be enabled or disabled and the data storage system may transition between the enable/disable states. In this embodiment, when the dual write option is enabled, a write to a portion of global memory is performed to two boards each including mirrored hardware. When dual write memory is disabled, the global memory write is performed to a single board. When transitioning between the enable and disable states, the synchronization techniques described herein may be used to synchronize among one or more directors or processors where the event is writing global memory to a single board (disabled dual mode) vs. two boards (enable dual mode). The foregoing synchronization techniques described herein may also be used when disabling the dual write in the event that one of the boards experiences a failure, and then once again when bringing a replacement board on-line to enable the dual write feature.

As described herein, the buffer pool may be used as a pool of free buffer space for the transmit queue and/or the receive queue. The extent to which this space is used may affect the selection and tuning of system parameters that may vary in accordance with each embodiment.

In connection with messages transmitted in the foregoing, it should be noted that other messages may be sent in response to receiving a message, such as an acknowledgement message, in accordance with the messaging protocol utilized. An acknowledgement message may be sent, for example, in response to a node or endpoint receiving a broadcast message. In the embodiment described herein, messages may be sent and generated by the hardware.

The foregoing embodiment described herein, such as in connection with FIG. 3, uses the same communication connection to transmit control messages and data messages. An embodiment may also use separate connections for transmitting each of control messages and data messages. Accordingly, this factor may be taken into account when determining bandwidth for processing messages in each particular embodiment.

It should be noted that the foregoing components described herein and the associated functionality may be performed in hardware and/or software. The hardware queues may be implemented, for example, using a portion and type of RAM. Software may be used to manage the synchronization key values. Hardware may be used to generate and send all flow control frames or messages. At a receiving node, hardware may receive the incoming data and control messages and then forward the incoming messages to software, for example, to manage and process synchronization key values.

In connection with the foregoing description, an embodiment may implement any one or more of a variety of different policies in connection with processing messages from the data and control queues. In one embodiment, a round-robin type of policy may be implemented such that, over time, the processing of messages from both queues approximates a Gaussian distribution. The foregoing techniques described herein may be implemented in an embodiment supporting the broadcast-based messaging protocol, or an equivalent.

The foregoing provides flexible synchronization techniques that may be used in an embodiment as a synchronization primitive with associated operations. The operations may be used as a general mechanism in performing synchronization of varying degrees and with a wide variety of different models, such as, for example, a peer to peer model, between the endpoints being synchronized.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for synchronizing a plurality of endpoints in a data storage system at a first synchronization point, the method comprising:
    performing, by a first endpoint, a synchronization start operation wherein a first message is sent from said first endpoint to one or more other endpoints in the data storage system, said first message including a first key value corresponding to said first synchronization point representing a current processing state of said first endpoint;
    determining, by said first endpoint, a timeout period;
    determining, by said first endpoint using processing state information as reported to said first endpoint by other endpoints, whether synchronization with a selected portion of said one or more other endpoints at said first synchronization point has been accomplished within said timeout period; and
    if said first endpoint determines that synchronization has not been accomplished within said timeout period, sending a second message to said one or more other endpoints indicating that said first endpoint is at another synchronization point different from said first synchronization point, wherein said first endpoint proceeds to a processing point beyond said first synchronization point prior to said timeout period expiring if said selected portion of said endpoints reaches said first synchronization point prior to said timeout period expiring.

2. The method of claim 1, wherein said plurality of endpoints are directors in said data storage system, said synchronization start operation defines a start of a synchronization period for the first endpoint, and said second message is sent as part of a synchronization stop operation marking an end of the synchronization period for the first endpoint.

3. The method of claim 2, wherein said first and second messages are synchronization messages sent using a message switch included in said data storage system.

4. The method of claim 3, further comprising:
    storing, by said first endpoint, said processing state information in a key value storage area local to said first endpoint.

5. The method of claim 4, further comprising:
    broadcasting, by each endpoint in the data storage system, a synchronization message including a key value corresponding to a current processing state of said each endpoint to every other endpoint in the data storage system; and
    recording, by each endpoint in the data storage system, key values for each endpoint for all received synchronization messages, each endpoint storing said key values in a key value storage area local to each endpoint.

6. The method of claim 5, wherein said determining whether synchronization with a selected portion of said one or more other endpoints at said first synchronization point has been accomplished within said timeout period is performed as part of a synchronization check operation.

7. The method of claim 6, wherein said second message is a synchronization message including a key value corresponding to said other synchronization point.

8. The method of claim 7, wherein said key value indicates one of: an invalid synchronization processing state, and another valid processing state of said first endpoint.

9. The method of claim 1, wherein said first endpoint determines whether synchronization has occurred for a subset of said selection portion of endpoints in accordance with said processing state information of said first endpoint.

10. The method of claim 1, wherein said selected portion of said one or more other endpoints is stored by said first endpoint as a synchronization mask.

11. The method of claim 10, wherein said synchronization mask includes a number of bits equal to a maximum number of possible endpoints in a data storage system.

12. The method of claim 1, wherein said timeout period is determined in accordance with an operation being performed for which said first synchronization point is specified.

13. The method of claim 1, wherein each endpoint in said data storage system maintains a local copy of state information representing a processing state of each endpoint as reported by each endpoint in synchronization messages sent over a message switch.

14. The method of claim 13, wherein each local copy of state information as maintained by each endpoint is not synchronized with other local copies of state information as maintained by other endpoints.

15. The method of claim 1, wherein said first synchronization point represents an event corresponding to one of: enabling and disabling a mirrored write operation wherein when enabled, a write to a portion of a global memory is performed to two memory boards, and when disabled, a write to a portion of a global memory is performed to one memory board.

16. The method of claim 1, wherein said first synchronization point represents an event corresponding to one of: enabling and disabling operations to a hardware element.

17. The method of claim 16, further comprising:
    disabling operations to said hardware element when said hardware element is brought off-line.

18. The method of claim 17, further comprising:
    enabling operations to said hardware element when said hardware element is brought on-line.

19. A method for synchronizing a plurality of endpoints in a data storage system at a first synchronization point, the method comprising:
    performing, by a first endpoint, a synchronization start operation wherein a first message is sent from said first endpoint to one or more other endpoints in the data storage system, said first message including a first key value corresponding to said first synchronization point representing a current processing state of said first endpoint;
    determining, by said first endpoint, a timeout period;
    determining, by said first endpoint using processing state information as reported to said first endpoint by other endpoints, whether synchronization with a selected portion of said one or more other endpoints at said first synchronization point has been accomplished within said timeout period; and
    if said first endpoint determines that synchronization has not been accomplished within said timeout period, sending a second message to said one or more other endpoints indicating that said first endpoint is at another synchronization point different from said first synchronization point, and wherein each endpoint in said data storage system maintains a local copy of state information representing a processing state of each endpoint as reported by each endpoint in synchronization messages sent over a message switch, and each local copy of state information as maintained by each endpoint is not synchronized with other local copies of state information as maintained by other endpoints, and wherein said first endpoint is any one of said plurality of endpoints which reaches said first synchronization point prior to other endpoints included in said selection portion in accordance with said processing state information, said processing state information being a private copy of synchronization information associated with said first endpoint.

20. The method of claim 19, wherein each of said endpoints in said selected portion perform synchronization in accordance with a peer to peer model.

21. A method executed in a data storage system for synchronizing execution at a first synchronization point between a plurality of processors in said data storage system, the method comprising:
performing a synchronization start operation by a first processor defining a beginning of a synchronization period for said first processor, said synchronization start operation including said first processor performing:
sending a first synchronization message to all other processors in said data storage system, said first synchronization message include a first key value corresponding to said first synchronization point representing a current processing state of said first processor;
determining a portion of said plurality of processors with whom said first processor is to synchronize at said first synchronization point;
determining whether synchronization at said first synchronization point has been accomplished for said portion of processors; and
determining an expiration period indicating a maximum amount of time for which said first processor will wait for synchronization at said first synchronization point for said portion of processors;
receiving one or more other synchronization messages from other ones of said plurality of processors in said data storage system wherein each of said one or more other synchronization messages includes a key value indicating a processing state of its sending processor;
storing, by said first processor in a key value storage local to said first processor, key values from said one or more other synchronization messages, wherein said first processor uses key values in said key value storage to determine whether synchronization at said first synchronization point has been accomplished for said portion of processors as part of a synchronization check operation; and
performing by said first processor a synchronization stop operation if synchronization at said first synchronization point is not accomplished for said portion of processors within said expiration time, said synchronization stop operation marking an end of the synchronization period for said first processor; and
wherein each processor communicates with other processors by sending messages using a message switch.

22. The method of claim 21, wherein each processor is an endpoint in said data storage system.

23. The method of claim 22, wherein said synchronization start operation, synchronization check operation, and synchronization stop operation are operations used in defining a synchronization primitive used in the data storage system to coordinate processing between multiple processors in said data storage system.

24. A computer program product stored on a computer readable storage medium for synchronizing a plurality of endpoints in a data storage system at a first synchronization point, the computer program product comprising:
executable code that performs, by a first endpoint, a synchronization start operation wherein a first message is sent from said first endpoint to one or more other endpoints in the data storage system, said first message including a first key value corresponding to said first synchronization point representing a current processing state of said first endpoint;
executable code that determines, by said first endpoint, a timeout period;
executable code that determines, by said first endpoint using processing state information as reported to said first endpoint by other endpoints, whether synchronization with a selected portion of said one or more other endpoints at said first synchronization point has been accomplished within said timeout period; and
executable code that, if said first endpoint determines that synchronization has not been accomplished within said timeout period, sends a second message to said one or more other endpoints indicating that said first endpoint is at another synchronization point different from said first synchronization point, wherein said first endpoint proceeds to a processing point beyond said first synchronization point prior to said timeout period expiring if said selected portion of said endpoints reaches said first synchronization point prior to said timeout period expiring.

25. The computer program product of claim 24, wherein said plurality of endpoints are directors in said data storage system, said synchronization start operation defines a start of a synchronization period for the first endpoint, and said second message is sent as part of a synchronization stop operation marking an end of the synchronization period for the first endpoint.

26. The computer program product of claim 25, wherein said first and second messages are synchronization messages sent using a message switch included in said data storage system.

27. The computer program product of claim 26, further comprising:
executable code that stores, by said first endpoint, said processing state information in a key value storage area local to said first endpoint.

28. The computer program product of claim 27, further comprising:
executable code that broadcasts, by each endpoint in the data storage system, a synchronization message including a key value corresponding to a current processing state of said each endpoint to every other endpoint in the data storage system; and
executable code that records, by each endpoint in the data storage system, key values for each endpoint for all received synchronization messages, each endpoint storing said key values in a key value storage area local to each endpoint.

29. The computer program product of claim 28, wherein said executable code that determines whether synchronization with a selected portion of said one or more other endpoints at said first synchronization point has been accomplished within said timeout period is performed as part of a synchronization check operation.

30. The computer program product of claim 29, wherein said second message is a synchronization message including a key value corresponding to said other synchronization point.

31. The computer program product of claim 30, wherein said key value indicates one of: an invalid synchronization processing state, and another valid processing state of said first endpoint.

32. The computer program product of claim 24, wherein said first endpoint determines whether synchronization has occurred for a subset of said selection portion of endpoints in accordance with said processing state information of said first endpoint.

33. The computer program product of claim 24, wherein said selected portion of said one or more other endpoints is stored by said first endpoint as a synchronization mask.

34. The computer program product of claim 33, wherein said synchronization mask includes a number of bits equal to a maximum number of possible endpoints in a data storage system.

35. The computer program product of claim 24, wherein said timeout period is determined in accordance with an operation being performed for which said first synchronization point is specified.

36. The computer program product of claim 24, wherein each endpoint in said data storage system maintains a local copy of state information representing a processing state of each endpoint as reported by each endpoint in synchronization messages sent over a message switch.

37. The computer program product of claim 36, wherein each local copy of state information as maintained by each endpoint is not synchronized with other local copies of state information as maintained by other endpoints.

38. The computer program product of claim 24, wherein said first synchronization point represents an event corresponding to one of: enabling and disabling a mirrored write operation wherein when enabled, a write to a portion of a global memory is performed to two memory boards, and when disabled, a write to a portion of a global memory is performed to one memory board.

39. The computer program product of claim 24, wherein said first synchronization point represents an event corresponding to one of: enabling and disabling operations to a hardware element.

40. The computer program product of claim 39, further comprising:
disabling operations to said hardware element when said hardware element is brought off-line.

41. A computer program product stored on a computer readable storage medium for synchronizing a plurality of endpoints in a data storage system at a first synchronization point, the computer program product comprising:
executable code that performs, by a first endpoint, a synchronization start operation wherein a first message is sent from said first endpoint to one or more other endpoints in the data storage system, said first message including a first key value corresponding to said first synchronization point representing a current processing state of said first endpoint;
executable code that determines, by said first endpoint, a timeout period;
executable code that determines, by said first endpoint using processing state information as reported to said first endpoint by other endpoints, whether synchronization with a selected portion of said one or more other endpoints at said first synchronization point has been accomplished within said timeout period; and
executable code that, if said first endpoint determines that synchronization has not been accomplished within said timeout period, sends a second message to said one or more other endpoints indicating that said first endpoint is at another synchronization point different from said first synchronization point, wherein each endpoint in said data storage system maintains a local copy of state information representing a processing state of each endpoint as reported by each endpoint in synchronization messages sent over a message switch, and each local copy of state information as maintained by each endpoint is not synchronized with other local copies of state information as maintained by other endpoints, and
wherein said first endpoint is any one of said plurality of endpoints which reaches said first synchronization point prior to other endpoints included in said selection portion in accordance with said processing state information, said processing state information being a private copy of synchronization information associated with said first endpoint.

42. The computer program product of claim 41, wherein each of said endpoints in said selected portion perform synchronization in accordance with a peer to peer model.

43. A computer program product stored on a computer readable storage medium for use in a data storage system for synchronizing execution at a first synchronization point between a plurality of processors in said data storage system, the computer program product comprising:
executable code that performs a synchronization start operation by a first processor defining a beginning of a synchronization period for said first processor, said first processor include executable code that performs said synchronization start operation including:
executable code that sends a first synchronization message to all other processors in said data storage system, said first synchronization message include a first key value corresponding to said first synchronization point representing a current processing state of said first processor;
executable code that determines a portion of said plurality of processors with whom said first processor is to synchronize at said first synchronization point;
executable code that determines whether synchronization at said first synchronization point has been accomplished for said portion of processors; and
executable code that determines an expiration period indicating a maximum amount of time for which said first processor will wait for synchronization at said first synchronization point for said portion of processors;
executable code that receives one or more other synchronization messages from other ones of said plurality of processors in said data storage system wherein each of said one or more other synchronization messages includes a key value indicating a processing state of its sending processor;
executable code that stores, by said first processor in a key value storage local to said first processor, key values from said one or more other synchronization messages, wherein said first processor uses key values in said key value storage to determine whether synchronization at said first synchronization point has been accomplished for said portion of processors as part of a synchronization check operation; and
executable code that performs, by said first processor, a synchronization stop operation if synchronization at said first synchronization point is not accomplished for said portion of processors within said expiration time, said synchronization stop operation marking an end of the synchronization period for said first processor; and wherein each processor communicates with other processors by sending messages using a message switch.

44. The computer program product of claim 43, wherein each processor is an endpoint in said data storage system.

45. The computer program product of claim 44, wherein said synchronization start operation, synchronization check operation, and synchronization stop operation are operations used in defining a synchronization primitive used in the data storage system to coordinate processing between multiple processors in said data storage system.

* * * * *